(12) United States Patent
Cusiné Barber (10) Patent No.: US 11,638,399 B2
(45) Date of Patent: May 2, 2023

(54) DEVICE FOR PICKING UP FORAGE BALES FROM THE GROUND AND SELF-LOADING FORAGE BALE MACHINE COMPRISING THIS DEVICE

(71) Applicant: ARCUSIN S.A., Vila-Sana (ES)

(72) Inventor: Manuel Cusiné Barber, Vila-Sana (ES)

(73) Assignee: ARCUSIN S.A., Vila-Sana (ES)

( * ) Notice: Subject to any disclaimer, the term of this patent is extended or adjusted under 35 U.S.C. 154(b) by 0 days.

(21) Appl. No.: 17/597,893

(22) PCT Filed: Jul. 28, 2020

(86) PCT No.: PCT/EP2020/071243
§ 371 (c)(1),
(2) Date: Jan. 28, 2022

(87) PCT Pub. No.: WO2021/018880
PCT Pub. Date: Feb. 4, 2021

(65) Prior Publication Data
US 2022/0361410 A1    Nov. 17, 2022

(30) Foreign Application Priority Data

Jul. 31, 2019  (EP) .................................... 19382660

(51) Int. Cl.
*A01D 87/12* (2006.01)
(52) U.S. Cl.
CPC .................................. *A01D 87/122* (2013.01)
(58) Field of Classification Search
CPC ................................................. A01D 87/122
See application file for complete search history.

(56) References Cited

U.S. PATENT DOCUMENTS 3,550,746 A    12/1970  Juul
3,661,287 A *   5/1972  McCarty ................ A01D 90/08
                                                198/522

(Continued)

FOREIGN PATENT DOCUMENTS

ES    2645023         12/2017
ES    2645023 B1      8/2018

OTHER PUBLICATIONS

International Search Report issued in PCT/EP2020/071243, dated Dec. 8, 2020.

*Primary Examiner* — Saul Rodriguez
*Assistant Examiner* — Ashley K Romano
(74) *Attorney, Agent, or Firm* — Ice Miller LLP (57) ABSTRACT

Device for collecting forage bales found on the ground, wherein it includes first means (17) of traction of bales (19) and dragging means (2) of said first traction means (17) mounted on a first chassis (1) of a frame in such a way that they define a first section ("A") of ascent of the bales, means (16) of traction of the bales and means (4) of dragging those means (16) of traction mounted on a second chassis (3) of the frame so that they define a second section ("B") of ascent of the bales coming from the first section ("A") of ascent, the first chassis (1) being joined to the second chassis (3) in such a way that it is capable of rotating around a rotating axle ("Y") due to the effect of the force of the impact with the bales, the first means (17) approaching the ground, and the device comprising a set (8) of shock absorbers of the turning movement of the first chassis (1).

20 Claims, 9 Drawing Sheets

(56) References Cited

U.S. PATENT DOCUMENTS

| | | | | |
|---|---|---|---|---|
| 3,675,802 | A | * | 7/1972 | Best .................. A01D 90/08 198/638 |
| 3,698,534 | A | * | 10/1972 | Hadfield ............... A01G 20/12 198/308.1 |
| 3,841,504 | A | * | 10/1974 | Spasuik ................. B60P 1/48 414/24.5 |
| 8,003,143 | B2 | * | 8/2011 | Taylor ................ B65B 25/065 426/231 |
| 2012/0055759 | A1 | * | 3/2012 | Horst .................. B65G 65/16 198/512 |
| 2014/0003887 | A1 | | 1/2014 | Thompson et al. |
| 2017/0347527 | A1 | | 12/2017 | Cusine Barber |

* cited by examiner

DEVICE FOR PICKING UP FORAGE BALES FROM THE GROUND AND SELF-LOADING FORAGE BALE MACHINE COMPRISING THIS DEVICE

CROSS-REFERENCE TO RELATED PATENT APPLICATIONS

This is a U.S. National Phase Application under 35 U.S.C. § 371 of International Patent Application No. PCT/EP2020/071243, filed Jul. 28, 2020, and claims priority to European Application No. 19382660.9, filed Jul. 31, 2019, which is incorporated by reference in its entirety. The International Application was published on Feb. 4, 2021, as International Publication No. WO/2021/018880 A1.

The present invention refers to a device for picking up bales of forage found on the ground and lifting them onto a platform of a self-loading machine. It also refers to a self-loading forage bale machine that includes the device. This pick-up device referred to in this invention is suitable for being coupled to the frame of a self-loading machine, such as a trailer or bale packer, for the purpose of picking up both large-format and small-format prismatic bales.

BACKGROUND OF THE INVENTION

State of the art forage bale pick-up devices are available, which include a clamp arranged to pick up a bale from the ground at its sides and lift the bale to a loading platform. Other devices include hooks that are nailed to the bale flush with the ground to pick it up and bring it up to the loading platform. Finally, there are also devices of the inclined plane type which include traction means configured as traction tines of the bales which are connected to drag chains arranged to move the bales along an inclined ascent plane to the loading platform.

The disadvantage of the inclined plane type pick-up devices is that the bales have to cross a considerable step to climb to the trailing plane where the traction tines driven by the chains are located. This step makes it difficult to lift the bales, and the traction tines must make a considerable effort at a certain height of the ground to lift the bales. This results in very significant wear and often in the breakage of the tines themselves or of the drag chains.

The Spanish patent ES2645023B1 describes a device to pick up forage bales of an inclined plane type that solves the above mentioned drawbacks. This device combines first and second means of traction with differentiated functions that contact the bales in two different positions. The first means of traction are associated with dragging chains arranged in an advanced attack position to lift the bales flush with the ground and move the bales up to a second means of traction, which are associated with dragging chains arranged to move the bales along an inclined plane to the loading platform. Thanks to this, the step that the bales have to save to climb to the drag plane of the second means of traction is very reduced, which smoothes the bale pick up and reduces the loss of forage due to friction during the climb.

However, the device described in patent ES2645023B1 presents difficulties of rising bales when the travel speed of the self-loading machine is high. This is due to the rebound effect that occurs when the dragging chains contact the bales found on the ground at high speed. This rebound effect results in a loss of climbing effectiveness and a loss of material due to friction with the ground. Another disadvantage of this device lies in the fact that the force of the impact with the bales weakens the frame structure, malfunctions the bales by deforming them, extracts material from the bales and produces breakage of the ropes that hold the forage bales.

It is therefore necessary to provide a device to pick up forage bales of an inclined plane type that allows the forage bales found on the ground to be raised quickly and smoothly, without slowing down the speed of movement of the self-loading machine, and without involving a loss of forage either by friction or broken ropes of the forage bales.

DESCRIPTION OF THE INVENTION

The objective of the present invention is to provide a device for picking up forage bales from the ground, and a self-loading machine including such a device, which resolves the aforementioned drawbacks and presents the advantages to be described below.

In accordance with this objective, in a first aspect, the present invention provides a forage bale pick-up device including a frame capable of being moved by a self-loading forage bale machine, and which is characterised in that it comprises;

first traction means of the bales, and dragging means of said first traction means mounted on a first chassis of the frame in such a way that they define a first upward stretch "A" of bales, and second traction means of the bales and dragging means of said second traction means mounted on a second chassis of the frame in such a way as to define a second upward stretch "B" of bales coming from the first upward stretch "A", and in that;

the first chassis is articulately attached to the second chassis in a rotating manner, so that it can rotate around a rotating "Y" axis due to the effect of the impact force with the bales, from an extended initial position to a retracted position intended to bring the first traction means closer to the ground in order to maximise the contact of said first traction means with the bales on the ground, the device comprising a damper assembly of the rotating movement arranged in such a way as to compensate on the first chassis the force of the impact of the bales causing the turn, and to actuate the return to the extended initial position of the first chassis when the force of the impact ceases.

According to a second aspect, the present invention provides a self-loading forage bale machine comprising the claimed device for picking up forage bales and loading them onto a machine platform.

The self-loading machine can be, for instance, a self-loading trailer for large-format forage bales, or a forage bale bale packer.

The device of the present invention has the advantage that it includes a folding chassis equipped with the first traction means of the bales. This folding chassis is capable of rotating around a pivoting axis ("Y") due to the effect of the impact with the bales, in such a way that it acquires a retracted position in which it is oriented towards the vertical in order to make it easier for the first means of traction to contact the bales found on the ground. In this way, more traction is achieved and a smooth and quick rise of the bales found on the ground is facilitated. The movement of this folding chassis causes the first traction means to move closer to the ground. This approach of the traction means to the ground makes the pick-up much more effective, as it reduces the height of the step that the bale must climb, which significantly improves the pick-up. The device also includes a damper assembly of the rotating movement of the folding chassis that allows a fraction of the energy caused by the impact with the bales to be absorbed, and actuation of the return of the folding chassis to the extended initial position when the force of the impact ceases. In this extended initial position, the folding chassis is elevated on the ground and protected to avoid impacts with undesirable objects.

With the claimed device, the self-loading machine can be moved at high speeds to pick up bales without the rebound effect of the chassis that damages the frame structure of the device and machine.

Indeed, in the claimed device, when the impact with the bales occurs, a damped rotating movement is generated that brings the folding chassis (or first chassis of the frame) to the ground as close and as necessary as possible, placing it in a retracted position that facilitates the contact of the traction means with a lateral surface of the bales. The same set activates the return of the folding chassis to the extended initial position, when the force of the impact ceases.

According to one embodiment, the damper assembly of the rotating movement comprises at least one damping element interposed between the first chassis, or folding chassis, and the second chassis, and which is operationally associated with the pivoting "Y" axis, in such a way that it allows the force of the impact of the bales to be compensated on the folding chassis, and to actuate the return to the extended initial position of the said chassis when the force of the impact ceases.

Preferably, the damper assembly comprises at least one elastic damping element operationally associated with the rotating "Y" axis. This elastic damping element can be, for instance, an element selected from a spring or strap, such as a tension spring, a compression spring, a torsion spring, or any other equivalent elastic damping element capable of damping the rotating movement of the first chassis, or a folding chassis.

Advantageously, at least one elastic damping element is a pre-stressed spring or strap arranged operationally around the pivoting "Y" axis, in such a way that one end of the spring or strap is coupled to the first chassis, or folding chassis, and the other end of the spring or strap is coupled to the second chassis.

Once again, at least one elastic damping element is advantageously configured with a recovery force adjustable according to, for instance, the weight of the bales and/or the travel speed of the frame. In this way, the device adapts to different needs, always providing optimum performance.

According to a preferred embodiment, the first chassis, or folding chassis, comprises a plurality of sub-chassis on which the first traction means are distributed, and said sub-chassis are attached in a rotary way to the second chassis so that each of the sub-chassis is capable of rotating independently around its respective pivoting "Y" axis, from the initial extended position to the retracted position, the device including a damper assembly of the rotary movement of each of the folding sub-chassis.

Preferably, according to the same embodiment, the damper assembly comprises at least one damping element of the rotational movement for each of the folding sub-chassis, each of these damping elements being operationally associated with the pivoting axis ("Y") of the sub-chassis, in such a way that it allows independent compensation, on each of the sub-chassis, of the force of the impact of the bales, and independent actuation of the return to the extended initial position of each of the sub-chassis when the force of the impact yields.

This embodiment has the advantage that each folding sub-chassis can rotate independently by impacting with a different portion of the bale surface, which allows the rotation movement of each sub-chassis to be adapted according to the position of the bale found on the ground. It must be borne in mind that the position of the bale on the ground is never the same. With the independent folding sub-chassis, greater traction is achieved on the bales and a smoother picking up and climbing of bales, without undesirable stresses on the frame.

Preferably, according to one embodiment, the dragging means of the first traction means comprise at least one dragging chain mounted on the folding chassis, or each of the folding sub-chassis, in order to be able to rotate together with the chassis or sub-chassis around their respective pivoting "Y" axis.

Advantageously, according to the same embodiment, the pivoting axis "Y" of the folding chassis, or of each of the folding sub-chassis, comprises, or coincides with, a driving shaft of the dragging chains of the first traction means mounted on the folding chassis, or on each of the folding sub-chassis. In this way, the folding chassis, or each of the folding sub-chassis, can rotate around the driving shaft that drives the movement of the dragging chains of the first traction means to acquire the retracted position that facilitates the contact of the means of traction with the bales.

Preferably, according to the same embodiment, the dragging means of the second traction means comprise at least one dragging chain mounted on the second chassis in order to be able to transmit power to the driving shaft of at least one dragging chain of the folding chassis, or of each of the folding sub-chassis.

In this way, the pivoting axis ("Y") of the folding chassis, or of each of the folding sub-chassis, includes, or coincides with, a power transmission axis that is operationally associated with the dragging chains of the second "B" upward stretch of bales mounted on the second chassis. This results in a very compact and efficient design.

According to this embodiment, the damper assembly of the rotating movement comprises at least one elastic damping element arranged in an operative way around the driving shaft of at least one dragging chain of the folding chassis, or of each of the folding sub-chassis.

Preferably, according to a preferred embodiment, the dragging means of the first traction means comprise at least two dragging chains mounted, preferably in parallel, on each of the folding sub-chassis, in order to be able to rotate around the same pivoting "Y" axis; and the dragging means of the second traction means comprise at least one dragging chain mounted on the second chassis in order to be able to transmit power to the driving shaft of the dragging chains of the folding sub-chassis. Advantageously, this driving shaft includes, or coincides with, the pivoting axis ("Y") of the sub-chassis.

According to the same preferred embodiment, the second chassis of the frame includes a plurality of dragging chains of the second traction means arranged, preferably in parallel, so that each of them transmits power to the driving shaft of at least two dragging chains from each of the folding sub-chassis, including that driving shaft, or coinciding that driving shaft with the pivoting axis ("Y") of the sub-chassis, so that each of the folding sub-chassis can rotate around the driving shaft of their respective dragging chains.

Advantageously, the plurality of dragging chains of the second means of traction of the second chassis define an inclined "B" upward stretch of bales coming from the folding chassis, or from the plurality of folding sub-chassis.

Preferably, the device comprises at least two gear wheels to drive each of the dragging chains of the second chassis, one of said gear wheels being mounted on the driving shaft of the dragging chains of the chassis, or folding sub-chassis, in order to be able to transmit power to that driving shaft.

Advantageously, the first and second traction means of the bales comprise a plurality of traction elements configured to catch the bales while these bales move respectively on the folding chassis and the second chassis to the loading platform of the self-loading machine.

According to one preferred embodiment, the traction elements of the dragging chains mounted on the folding chassis, or on the folding sub-chassis, are configured with a length shorter than the length of the traction elements mounted on the second chassis, to protect the ropes from the forage bales. Advantageously, said traction elements include traction tines provided in links of the dragging chains. However, the same traction elements could be elements different from tines.

Preferably, the folding chassis, or each of the folding sub-chassis, of the device frame is articulately attached to the second chassis in a rotating manner so that the first traction means of the bales are placed on the ground, without touching the ground, in the extended initial position of the folding chassis, or of each of the folding sub-chassis.

In this way, in the extended initial position, the folding chassis, or each of the folding sub-chassis, is placed elevated on the ground and protected to avoid impacts with undesirable objects. When hit with a bale, the same chassis or folding sub-chassis oscillates by effect of the force of the impact to the retracted position approaching the ground as close and as necessary as possible to act on the bale.

Advantageously, the first chassis or folding chassis, or each of the folding sub-chassis, comprises stop means to limit the angle of rotation around the "Y" axis.

According to one embodiment, the stop means comprise a protrusion arranged on the folding chassis, or on each of the folding sub-chassis, so that it cooperates with a stop element arranged on the second chassis in order to limit the angle of rotation of the chassis or folding sub-chassis. Alternatively, instead of a protrusion, a sliding plate can be used at one end of the chassis or folding sub-chassis to abut with the ground when the chassis or sub-chassis turns into the retracted position.

Although it has been described that the first chassis, or folding chassis, is formed by a plurality of folding sub-chassis, it should be noted that the first chassis could constitute in itself a single folding structure with respect to the second chassis on which the dragging chains that incorporate the first traction means of the bales would be distributed.

Similarly, although it has been described that the pivoting axis ("Y") includes, or coincides with, the driving shaft axle of the dragging chains of the folding chassis and that this driving shaft receives power from the dragging chains of the second chassis, it should be noted that, depending on another embodiment, the dragging chains of the folding chassis, or of each of the folding sub-chassis, could be driven by a different driving shaft, which was not associated with the dragging chains of the second chassis.

In the present invention the terms folding chassis, or folding sub-chassis, are used interchangeably in the report to designate, respectively, the first chassis, or each of the sub-chassis of the device frame.

BRIEF DESCRIPTION OF THE DRAWINGS

In order to better understand the description made, a set of drawings has been provided which, schematically and solely by way of non-limiting example, represent a practical case of embodiment.

DESCRIPTION OF A PREFERRED EMBODIMENT

A preferred embodiment of the floor bale catcher of this invention is described below, referring to FIGS. 1 to 5 and FIGS. 6a, 6b, 6c, 6d. This device is intended to be coupled to a self-loading forage bale machine and to act as loading mouth of that machine (not represented). The machine can be, for example, a self-loading trailer or a bale packer of forage bales.

The pick-up device of the present invention comprises a frame capable of being coupled to a self-loading machine forage bales, which includes;

a first chassis 1, or folding chassis, on which the first means of traction of the bales 19 are distributed, which are arranged in dragging chains 2 in such a way that they define a first upward stretch "A" of bales 19, and a second chassis 3 on which some second means of traction of the bales 19 are distributed, arranged in dragging chains 4 in such a way that they define a second upward stretch "B" of the bales 19 coming from the first stretch "A".

In the embodiment described, the first chassis 1, or folding chassis, includes a plurality of sub-chassis 1a, 1b, 1c, 1d that are articulately attached in a rotating manner to the second chassis 3 in such a way that each of them can rotate independently around a respective pivoting axis ("Y"), from an extended initial position to a retracted working position intended to maximise the contact of the first means of traction with the ground bales. However, it is important to note that, according to another embodiment, the first chassis 1 could constitute in itself a single structure being able to pivot with respect to the second chassis 3 on which the dragging chains 2 incorporating the first means of traction of the bales 19 would be distributed.

Figure 1:
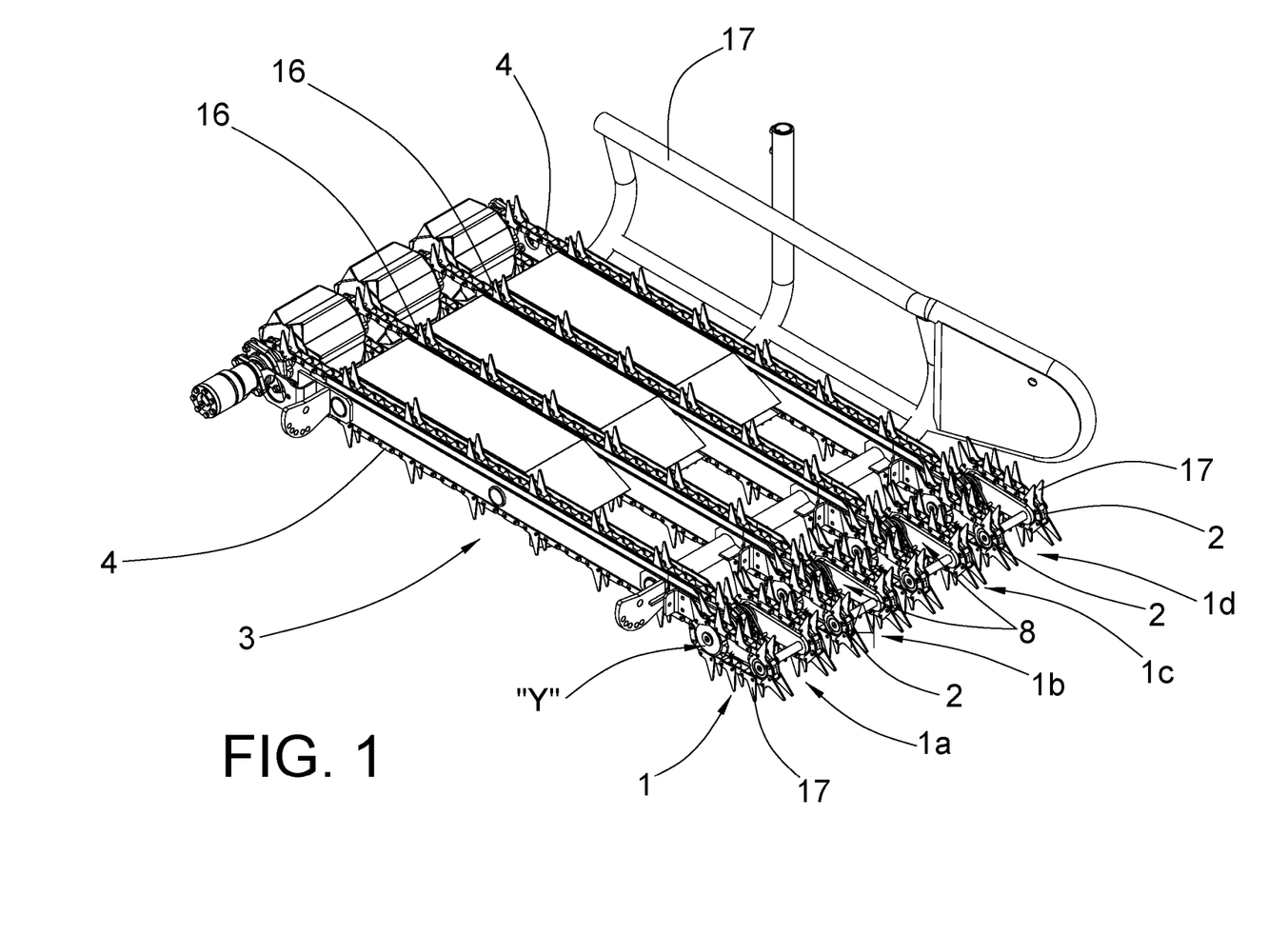
FIG. 1 is a perspective view of an embodiment of the device of the present invention in which the first means of traction of the bales are distributed over a plurality of independent sub-chassis which are attached in a rotating way to the second chassis of the frame so that they can rotate independently around a respective pivoting axis ("Y"). On the second chassis the second means of traction of the bales are distributed, which receive the bales coming from the plurality of folding sub-chassis to raise them up to a load platform (not represented).

FIG. 1 shows a perspective view of the embodiment of the device that includes the plurality of sub-chassis 1a, 1b, 1c, 1d, in which these folding sub-chassis are in the initial extended position, aligned with the structure of the second chassis 3.

Figure 2:
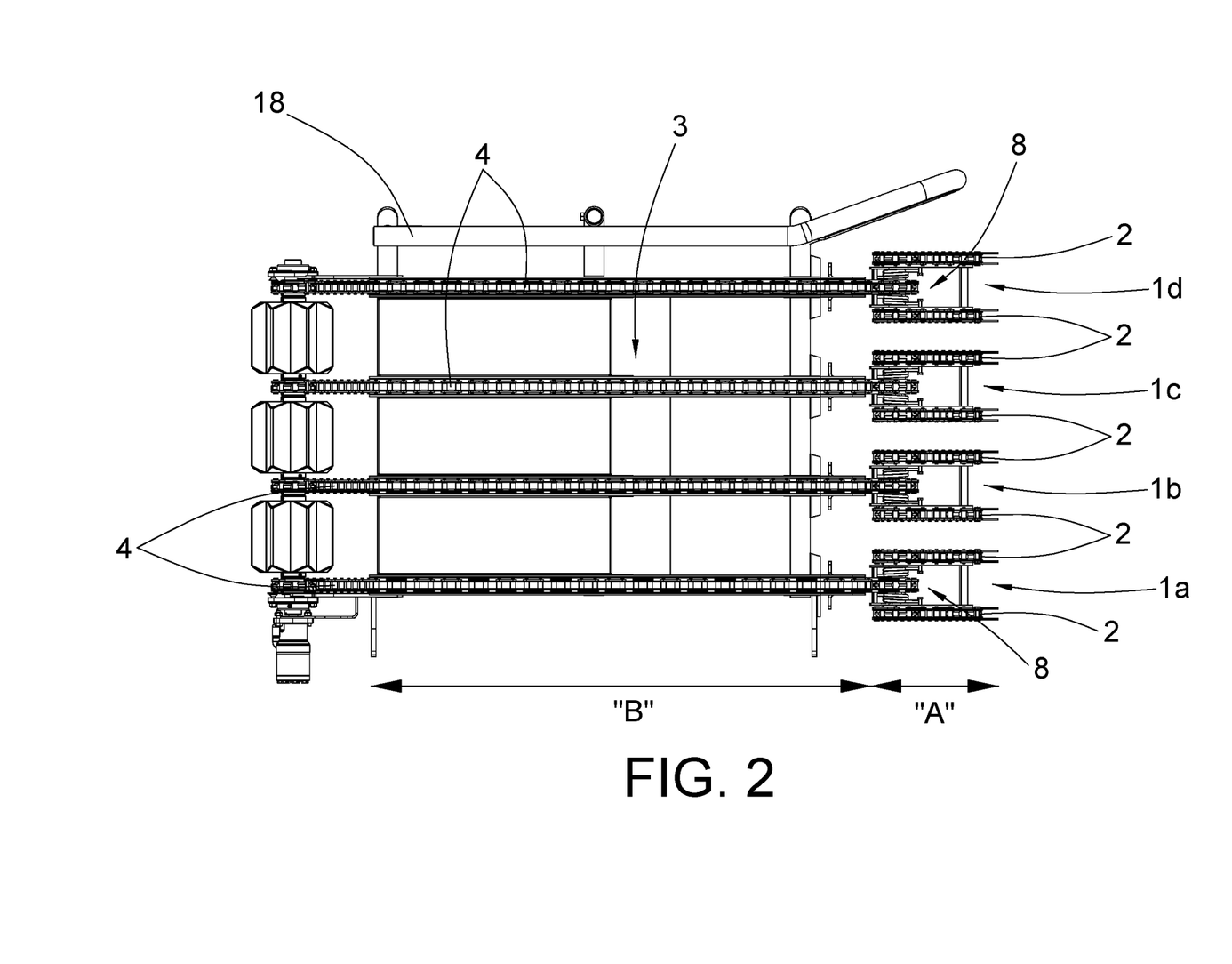
FIG. 2 is a plan view of the embodiment of the device in FIG. 1.
Figure 3:
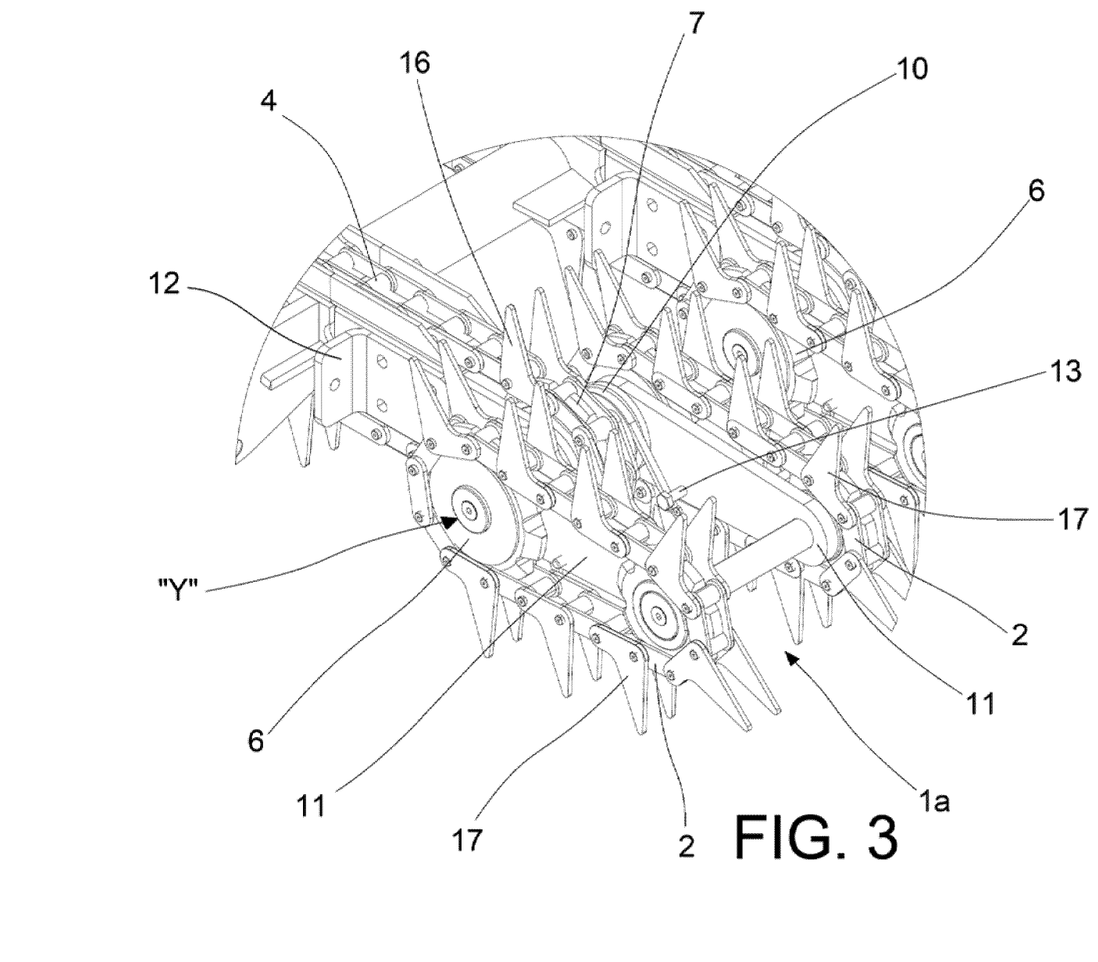
FIG. 3 shows a perspective view of a detail of a folding sub-frame of the device in FIG. 1 that includes two dragging chains of traction tines mounted to be able to rotate together with the sub-frame around its respective pivoting axis ("Y"). In this embodiment, both sub-chassis dragging chains are driven by a driving shaft that is located on the same rotating "Y" axis and receives power from a dragging chain mounted on the second chassis so that it is located between both dragging chains of the folding sub-chassis.
Figure 4:
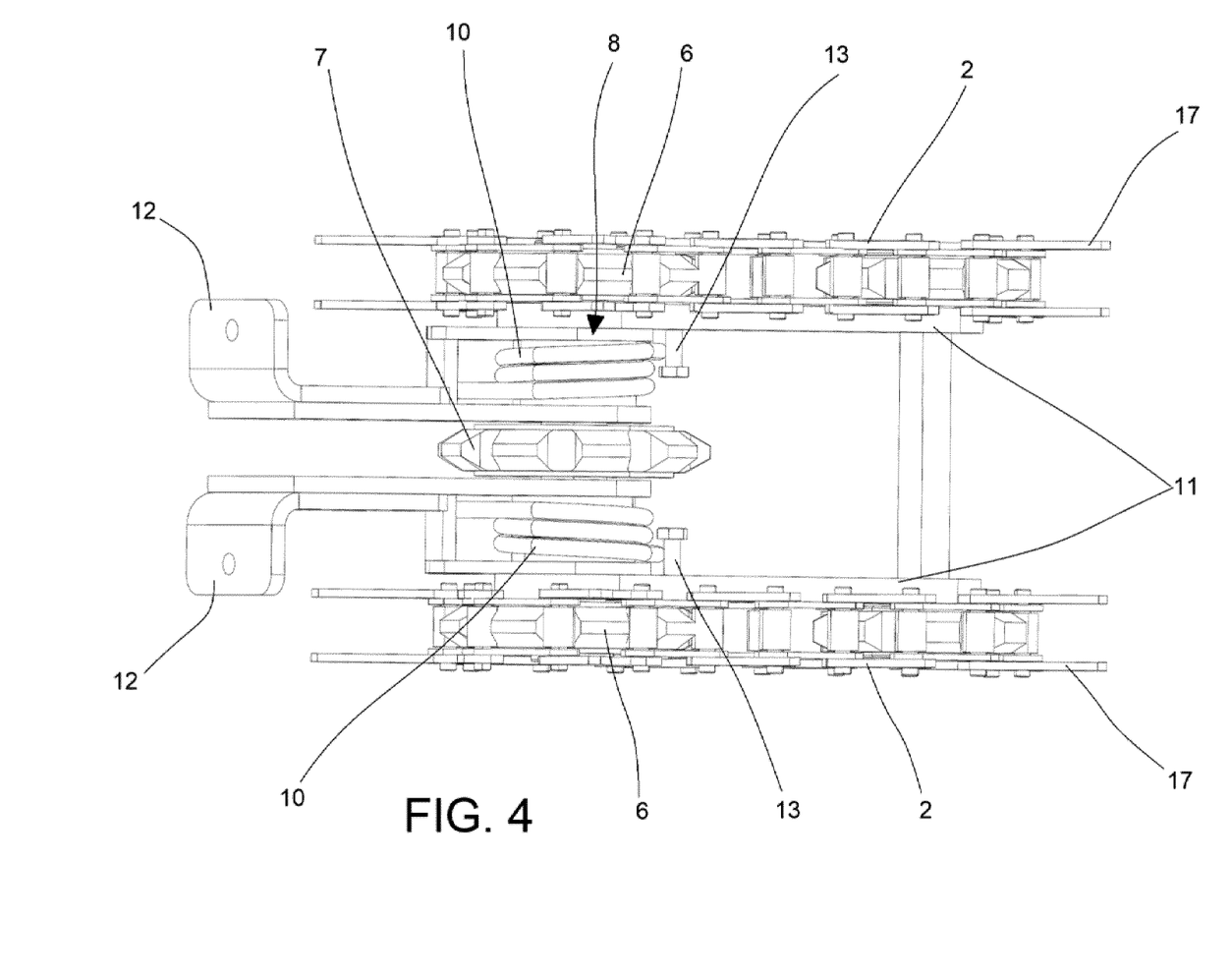
FIG. 4 shows a plan view of a folding sub-chassis of the device in FIG. 1. For reasons of clarity, this figure does not show the dragging chain of the second chassis, which is mounted on a gear wheel that transmits power to the dragging chains of the folding sub-chassis.

As can be seen in FIGS. 1 and 2, and in the details of FIGS. 3 and 4, each of the sub-chassis 1a, 1b, 1c, 1d, includes two drag chains 2 mounted in parallel to be able to rotate around their respective pivoting axis ("Y").

In the embodiment described and shown in the above figures, the pivoting axis ("Y") of each of the sub-chassis 1a, 1b, 1c, and 1d comprises a driving shaft 5 that simultaneously drives two dragging chains 2 through gear wheels 6 mounted in parallel on the driving shaft 5. A gear wheel 7 of a dragging chain 4 of the second chassis 3 is also mounted on this driving shaft which transmits power to the driving shaft 5. Thus, according to this embodiment, the dragging chains 4 of the second chassis 3 are the ones that transmit power to the dragging chains 2 of the folding sub-chassis 1a, 1b, 1c, 1d. However, according to another embodiment, the dragging chains of folding sub-chassis 1a, 1b, 1c, 1d could be driven by a different driving shaft, which was not associated with the dragging chains 4 of the second chassis 3.

As can be seen in FIGS. 1 and 2, on the second chassis 3 four dragging chains 4 are mounted incorporating second traction means configured by way of traction tines 16 arranged to move the bales along an upward inclined plane to a load platform (not represented). This set of dragging chains 4 and traction tines 16 define the second upward stretch "B" of bales coming from the first stretch "A".

In the embodiment described above, on folding sub-chassis 1a, 1b, 1c, 1d are distributed a total of eight dragging chains 2 which incorporate first means of traction configured also as traction tines 17, but shorter in length than the traction tines 16 of the traction chains 4 of the second chassis 3. This minimises bale string breakage when impacting the bales.

The device claimed has the particularity that it incorporates a damper assembly 8 for the turning movement of the first chassis 1 arranged in such a way that it allows the force of the impact of the bales that causes the turn to be compensated on the first chassis 1, and for the return to the extended initial position of the first chassis or folding chassis 1 to be activated when the force of the impact gives way.

In the embodiment described above, the device incorporates a damper assembly 8 of the rotating movement of each of the folding sub-chassis 1a, 1b, 1c, 1d. This damper assembly 8 includes at least one damping element for each of the sub-chassis, which is operationally associated with their respective pivoting axis ("Y"), so that it is possible to compensate independently on each of the sub-chassis 1a, 1b, 1c, 1d, the force of the impact of the bales 19, and to actuate the return to the extended initial position of each of the sub-chassis 1a, 1b, 1c, 1d when the force of the impact ceases.

Preferably, each folding sub-frame 1a, 1b, 1c, 1d incorporates two damping elements configured as torsion springs 10 that are operationally mounted around the "Y" axis to cushion the turning movement.

Figure 5:
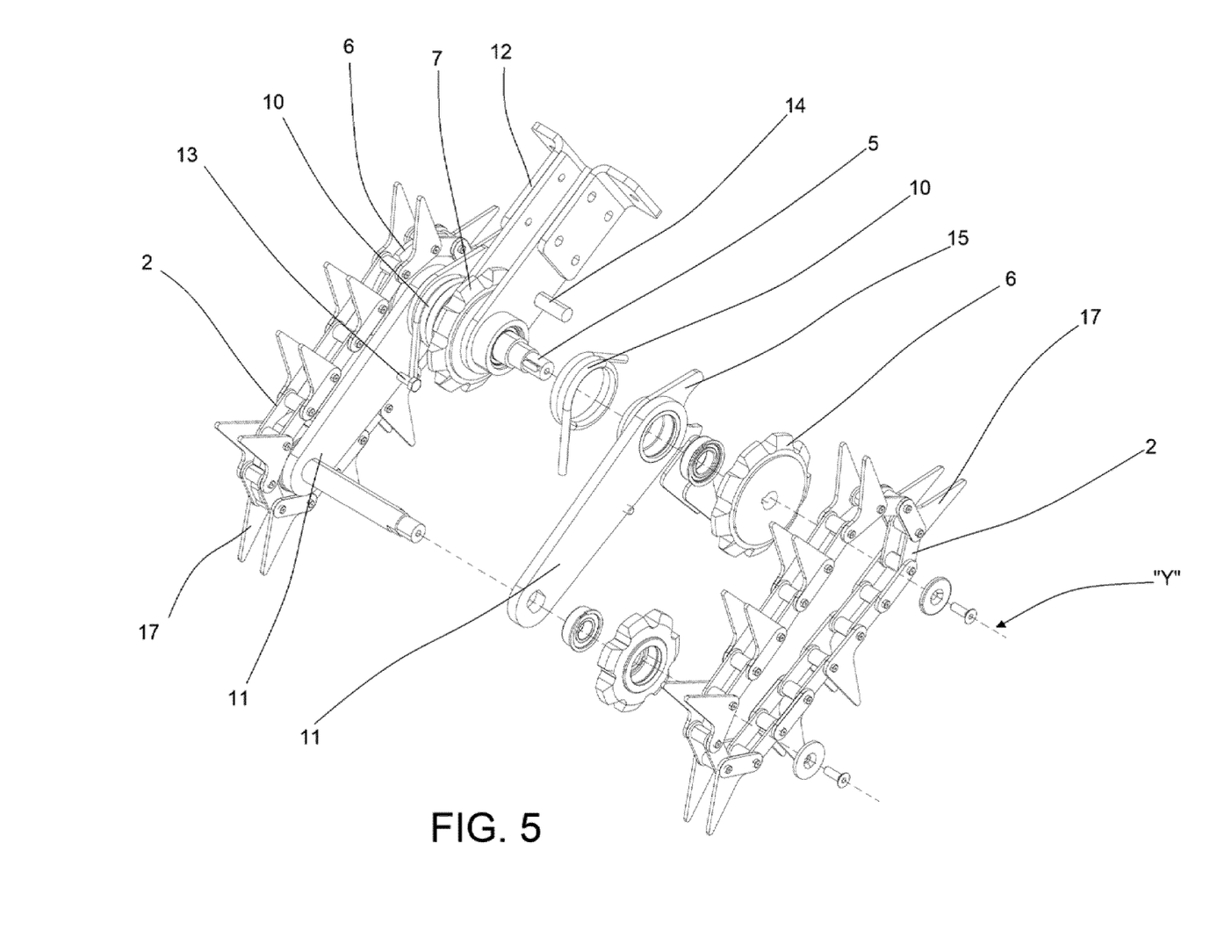
FIG. 5 is an expanded perspective view of the folding sub-chassis in FIG. 4 that shows, among other elements, the damping set of the rotating movement of the sub-chassis formed, in this case, by two torsion springs arranged around the pivoting axis ("Y") of the sub-chassis.

As can be seen in FIGS. 4 and 5, the torsion springs 10 are interposed between structures 11 that support the dragging chains 2 of each sub-chassis 1a, 1b, 1c, 1d and a structure 12 that supports the dragging chain 4 to the second chassis 3. In particular, one end of each torsion spring 10 is coupled to a bolt 13 foreseen in structure 11 that supports one of the chains 2 of sub-chassis 1a, 1b, 1c, 1d, and the other end of the same torsion spring 10 is coupled to another bolt 14 foreseen in structure 12 that supports the dragging chain 4 to the second chassis 3. In addition, both torsion springs 10 are pre-stressed so that they actuate the return of sub-frame 1a, 1b, 1c, 1d to the extended initial position when the impact force of the bales yields.

It is important to note that, instead of torsion springs 10, the damper assembly 8 of the device of this invention could use other types of damping elements, such as elastic damping elements of the strap type, or other types of springs other than torsion springs. However, preferably, the damping elements should be elastic and advantageously configured with an adjustable recovery force depending on the weight of the bales and/or the travel speed of the self-loading machine.

As can be seen from the expanded view in FIG. 5, the structures 11 supporting the dragging chains 2 of each 1a, 1b, 1c, 1d folding sub-chassis incorporate stop means to limit the angle of rotation of each of the sub-chassis around the pivoting axis ("Y"). In the embodiment described, these stop means comprise a protrusion 15 arranged in such a way that it cooperates with the bolt 13 of the structure 12 of the second chassis 3, in order to limit the angle of rotation of each sub-chassis in the working position of each structure 11. Alternatively, instead of a protrusion 15 (not shown), a sliding plate could be used which would be arranged at one end of each folding sub-chassis 1a, 1b, 1c, 1d to stop the floor in order to limit the angle of rotation of the sub-chassis 1a, 1b, 1c, 1d in the working position as well.

The operation of the device claimed is described below by reference to the sequence of FIGS. 6a, 6b, 6c, and 6d.

The claimed device moves over the field coupled to a self-loading machine (not represented) to pick up the forage bales that are found on the agricultural soil. As it moves, the plurality of folding sub-chassis 1a, 1b, 1c, 1d remain in the extended initial position, substantially aligned with the second chassis 3. In this extended position, the dragging tines 17 of the dragging chains 2 of the first chassis 1, or folding chassis, are elevated on the ground, with the axle of one of their driving gear wheels located at a height "h" dimensioned to avoid impacts with undesirable objects (see FIG. 6a).

The lowering of sub-chassis 1a, 1b, 1c, 1d occurs when the traction tines 17 of the dragging chains impact with a lateral surface of the forage bale 19 to be loaded onto the self-loading machine, e.g. onto a loading trailer. The impact causes each sub-chassis 1a, 1b, 1c, 1d to rotate around their respective pivoting axis "Y", counter clockwise, to a retracted position in which the sub-chassis approaches the ground as close and as necessary as possible, so that the dragging chains 2 are oriented vertically to facilitate contact of the traction tines 17 with the lateral surface of the bale 19 (see FIG. 6b).

As it has been commented in the description of the invention, the turning movement of each sub-chassis 1a, 1b, 1c, 1d is independent, so each sub-chassis 1a, 1b, 1c, 1d oscillates in a different way according to the angle with which it attacks or contacts the bale 19, which varies according to the position of the bale 19 on the ground. It should be noted that it is common for the bale 19 not to be aligned with the chassis but to be transposed to the ground.

Unlike the state of the art devices, the claimed device manages to raise the bale 19 quickly and smoothly, without causing undesirable stresses on the frame structure, since the 1a, 1b, 1c, 1d folding sub-chassis pivot independently to adapt to the position of the bale 19 found on the ground, maximising contact with the first means of traction.

Figure 6A:
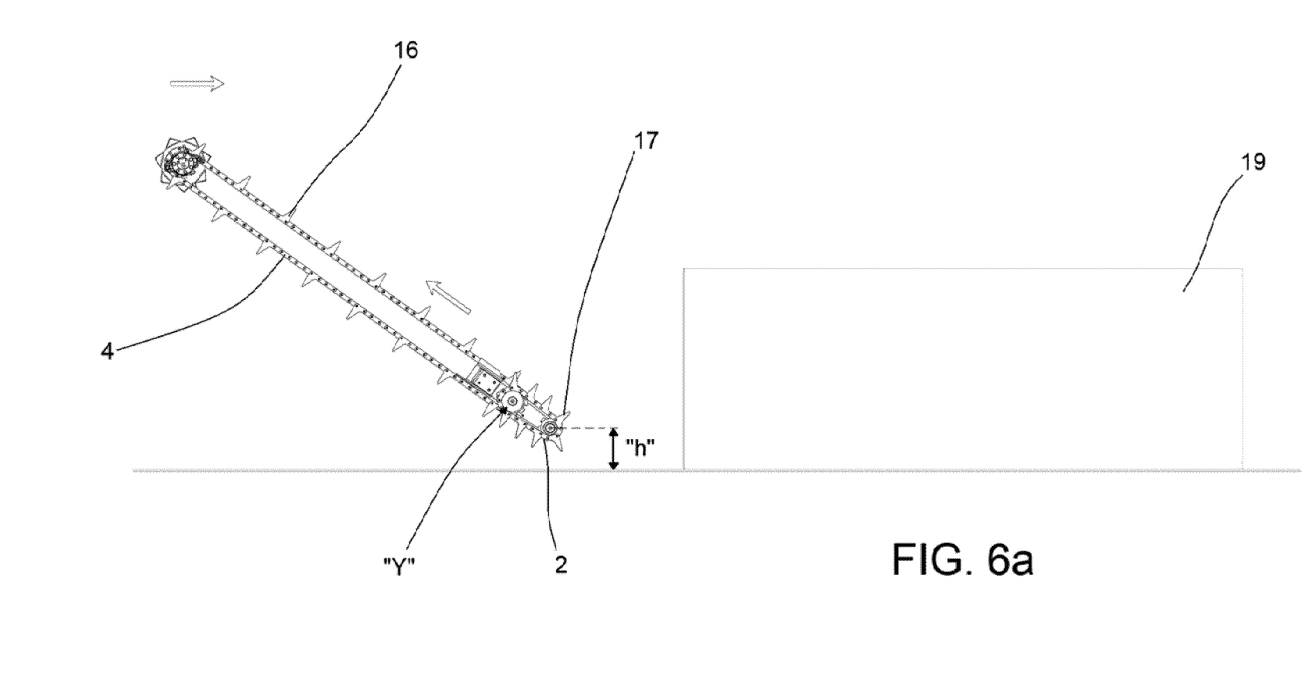
FIGS. 6a, 6b, 6c and 6d represent a picking up sequence of a forage bale found on the ground by the pick-up device of this invention.
Figure 6B:
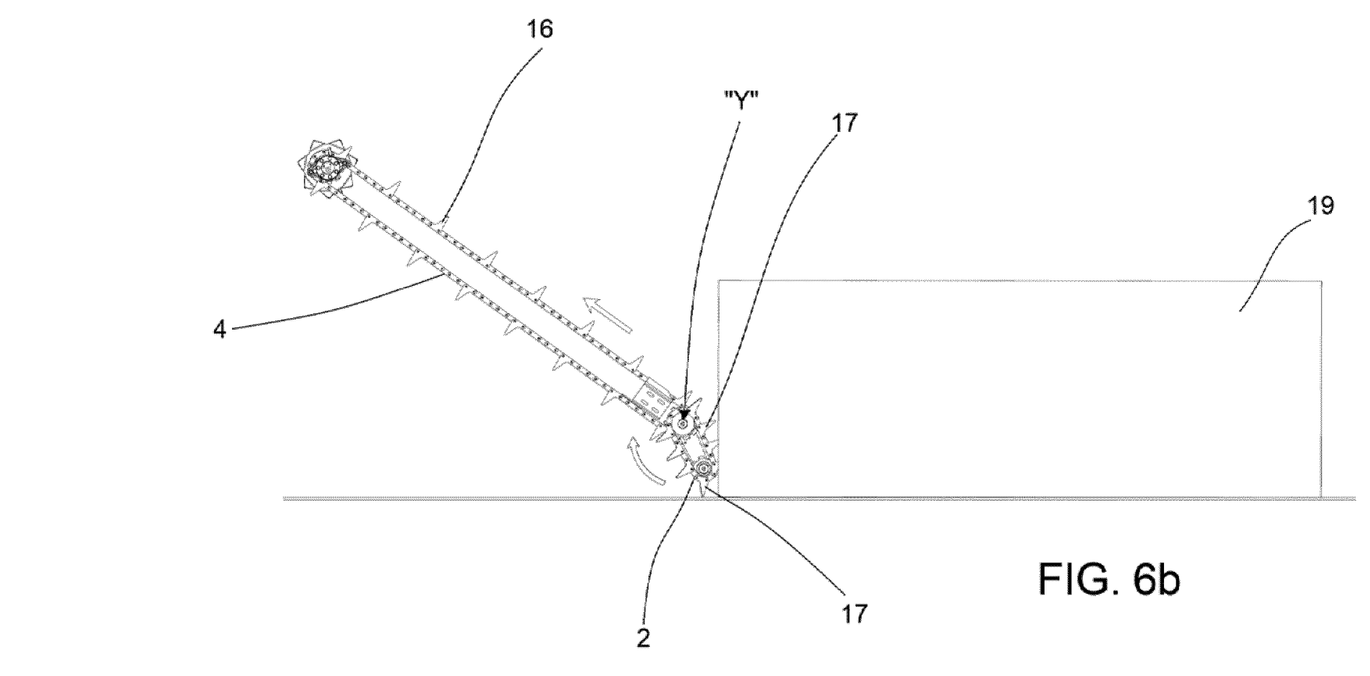
Figure 6C:
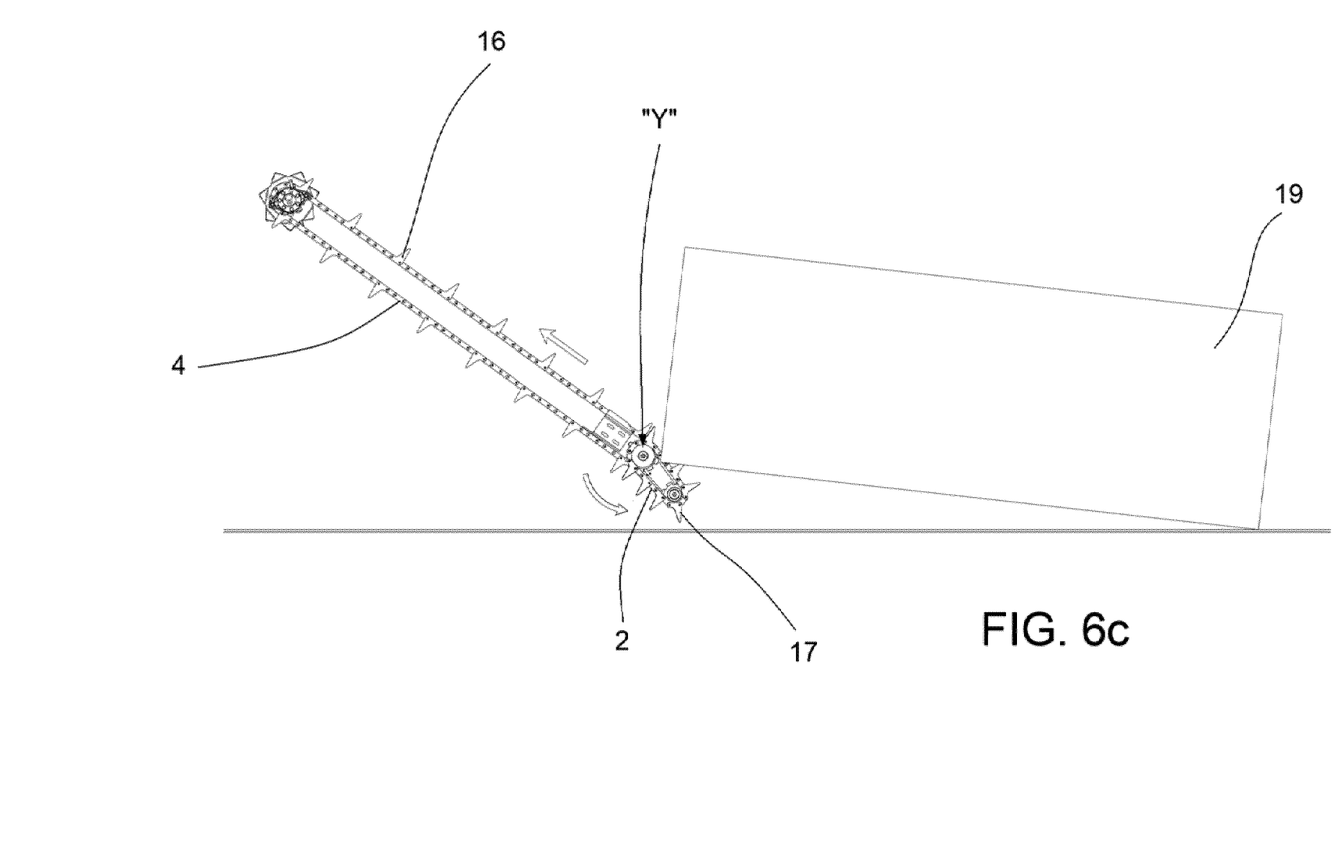
Figure 6D:
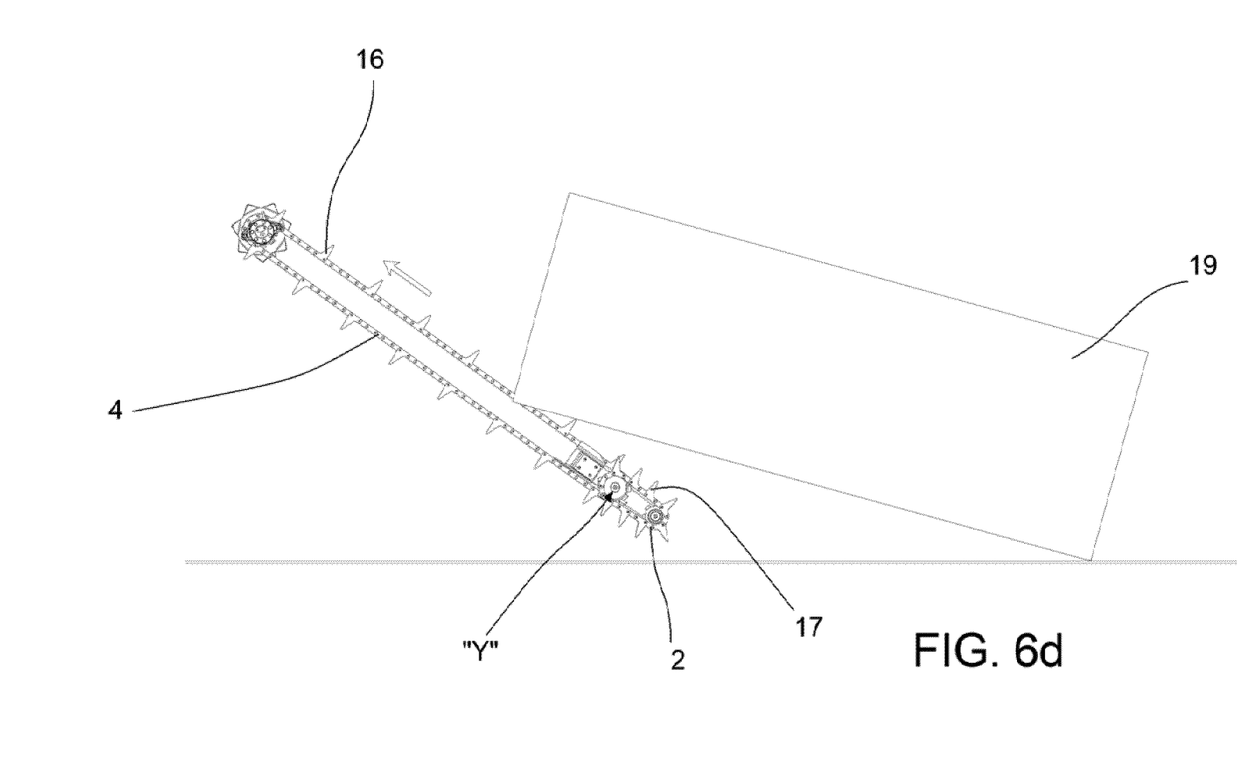

Another advantage of the claimed device lies in the existence of the damper assembly 8 of each folding sub-chassis 1a, 1b, 1c, 1d that allows the force of the impact of the bale 19 to be compensated, and the return to the initial extended position of sub-frame 1a, 1b, 1c, 1d to be activated. Thanks to this, as can be seen in FIG. 6c, while the traction tines 17 of the first traction means drag the bale 19 to raise it, the damper assembly 8 of sub-chassis 1a, 1b, 1c, 1d supports the weight of the bale 19 and tends to raise it, facilitating the ascent to the "B" upward stretch of the second chassis 3. In the position shown in FIG. 6c, the folding sub-chassis 1a, 1b, 1c, 1d are in an intermediate position in which they tend to return to the extended initial position (see FIG. 6c).

Once the bale 19 contacts the traction tines 16 of the dragging chains 4 of the second chassis 3, these dragging chains 4 pull the bale 19 along the uphill inclined plane until the bale 19 reaches the load platform of the self-loading machine, or an intermediate storage platform. While ascending the inclined plane, lateral structures 18 guide the bale 19 to prevent it from tipping over.

Surprisingly, the device claimed has the advantage that it allows bales to be loaded at high speeds, without the need to slow down the speed of the self-loading machine, avoiding the rebound effect produced by the impact of the bale on the state-of-the-art pick-up devices, and significantly reducing the effort that supports the chassis structure of the chassis.

Although reference has been made to a specific embodiment of the invention, it is clear to a person skilled in the art that the device described is susceptible to numerous variations and modifications, and that all the details mentioned can be replaced by other technically equivalent ones, without departing from the scope of protection defined by the attached claims. For example, although the chains 2, 4 represented are link chains, it would also be possible to use other types of chains or means of dragging the traction tines 16, 17. In the same way, instead of tines 16, 17 of traction, it would also be possible to use other type of equivalent elements that could also catch the bale 19 and move it along an inclined plane of ascent. On the other hand, although the described embodiment of the device includes four folding sub-chassis 1a, 1b, 1c, 1d associated with four 4 drag chains of the second chassis 3, a device with a different number of folding sub-chassis would also be possible, associated with an equivalent number of drag chains 4 of the second chassis 3, or alternatively, a device with a single structure as a first chassis 1, or folding chassis, which would be articulately attached to the second chassis 3 in a rotating way.

The invention claimed is:

1. A device for picking up bales of forage on the ground comprising a frame capable of being coupled to a self-loading forage bale machine, the device comprising:
    a first bale traction unit and a dragging mechanism of said first bale traction unit mounted on a first chassis of the frame in such a way as to define a first upward stretch; and
    a second bale traction unit and a dragging mechanism of said second bale traction unit mounted on a second chassis of the frame in such a way as to define a second upward stretch coming from the first upward stretch, wherein:
    the first chassis is configured to articulately attach in a rotating manner to the second chassis, so that it is capable of rotating around a rotating axis due to an impact force of a bale, from an extended initial position to a retracted position intended to bring the first bale traction unit closer to the ground in order to maximise contact with bales on the ground, and
    the device comprises a damper assembly configured to compensate on the first chassis an effect of the impact force of the bale, and to actuate a return to the extended initial position when the impact force ceases.

2. The device according to claim 1, wherein said damper assembly comprises at least one damping element interposed between the first chassis and the second chassis, and wherein the damper assembly is operationally associated with a pivoting axis in such a way that the effect of the impact force of the bale is compensated on the first chassis, and wherein the damper assembly is configured to actuate a return to the initial extended position of the first chassis when the impact force ceases.

3. The device according to claim 1, wherein said damper assembly comprises at least one elastic damping element operationally associated with a pivoting axis.

4. The device according to claim 3, wherein the at least one elastic damping element comprises a spring or a pre-stressed strap arranged operationally around the pivoting axis, so that one end of the spring or strap is coupled to the first chassis and another end of the spring or strap is coupled to the second chassis.

5. The device according to claim 3, wherein this elastic damping element is configured with a recovery force adjustable according to at least a weight of the bale or a speed of displacement of the frame.

6. The device according to claim 1, wherein the dragging mechanism of the first bale traction unit comprises at least one dragging chain mounted on the first chassis and configured to rotate together with said first chassis, around a pivoting axis.

7. The device according to claim 6, wherein a pivoting axis of the first chassis comprises, or coincides with, a driving shaft of at least one dragging chain of the first bale traction unit.

8. The device according to claim 7, wherein the dragging mechanism of the second bale traction unit comprises at least one dragging chain mounted on the second chassis and configured to transmit power to the driving shaft of the at least one dragging chain of the first bale traction unit.

9. The device according to claim 7, wherein the damper assembly comprises at least one elastic damping element operationally arranged around the driving shaft of said at least one dragging chain of the first bale traction unit of the first chassis.

10. The device according to claim 1, wherein said first chassis is configured to articulately attach to the second chassis in a rotating manner so that the first bale traction unit is kept elevated to a predetermined height when the first chassis is in the extended initial position.

11. The device according to claim 1, wherein the first chassis comprises a stop device to limit an angle of rotation around the pivoting axis.

12. A self-loading forage bale machine comprising the device for picking up forage bales according to claim 1.

13. A device for picking up bales of forage on the ground comprising a frame capable of being coupled to a self-loading forage bale machine, the device comprising:

a first bale traction unit and a dragging mechanism of said first bale traction unit mounted on a first chassis of the frame in such a way as to define a first upward stretch; and a second bale traction unit and a dragging mechanism of said second bale traction unit mounted on a second chassis of the frame in such a way as to define a second upward stretch coming from the first upward stretch, wherein:

the first chassis is configured to articulately attach in a rotating manner to the second chassis, so that it is capable of rotating around a rotating axis due to an impact force of a bale, from an extended initial position to a retracted position intended to bring the first bale traction unit closer to the ground in order to maximise contact with bales on the ground, the device comprises a damper assembly configured to compensate on the first chassis an effect of the impact force of the bale, and to actuate a return to the extended initial position when the impact force ceases, and said first chassis comprises a plurality of sub-chassis on which is distributed the first bale traction unit, and wherein said plurality of sub-chassis are attached in a rotating way to the second chassis so that each one of the plurality of sub-chassis is configured to rotate independently around its respective pivoting axis, from the extended initial position to the retracted position.

14. The device according to claim 13, wherein said damper assembly comprises a damping element for each of the plurality of sub-chassis which is operationally associated with the respective pivoting axis to compensate independently on each of the plurality of sub-chassis the impact force of the bale, and to actuate independently return to the extended initial position of each of the plurality of sub-chassis when the impact force ceases.

15. The device according to claim 13, wherein the dragging mechanism of the first bale traction unit comprises at least one dragging chain mounted on each of the plurality of sub-chassis and configured to rotate together with each of the plurality of sub-chassis around its respective pivoting axis.

16. The device according to claim 15, wherein a pivoting axis of at least one of the plurality of sub-chassis comprises, or coincides with, a driving shaft of at least one dragging chain of the first bale traction unit.

17. The device according to claim 16, wherein the dragging mechanism of the second bale traction unit comprises at least one dragging chain mounted on the second chassis and configured to transmit power to the driving shaft of the at least one dragging chain of the first bale traction unit.

18. The device according to claim 16, wherein the damper assembly comprises at least one elastic damping element operationally arranged around the driving shaft of said at least one dragging chain of the first bale traction unit of each of the plurality of sub-chassis.

19. The device according to claim 13, wherein the dragging mechanism of the first bale traction unit comprises: at least two dragging chains mounted on each of the plurality of sub-chassis and configured to rotate together with at least two respective ones of the plurality of sub-chassis around their respective pivoting axis; and at least one dragging chain mounted on the second chassis and configured to transmit power to a driving shaft.

20. The device according to claim 13, wherein each of the plurality of sub-chassis is configured to articulately attach to the second chassis in a rotating manner so that the first bale traction unit is kept elevated to a predetermined height when each of the plurality of sub-chassis is in the extended initial position.

* * * * *